United States Patent [19]

Mitchell

[11] 4,305,622
[45] Dec. 15, 1981

[54] WIRE WHEELS SEALING STRUCTURE

[75] Inventor: William E. Mitchell, Coventry, England

[73] Assignee: Dunlop Limited, London, England

[21] Appl. No.: 156,011

[22] Filed: Jun. 3, 1980

[30] Foreign Application Priority Data

Jun. 19, 1979 [GB] United Kingdom ............... 21391/79

[51] Int. Cl.³ ........................ B60B 21/06; B60B 21/12
[52] U.S. Cl. ........................................ 301/58; 301/97; 152/381.4; 152/381.6; 152/366; 29/159.1
[58] Field of Search ...................... 301/58, 55, 95-98; 152/366, 365, 379.5, 379.3, 381.3, 381.4, 381.6; 29/159.02, 159.1, 159.03

[56] References Cited

U.S. PATENT DOCUMENTS

| | | | |
|---|---|---|---|
| 1,777,223 | 9/1930 | Pugh | 152/366 |
| 4,015,652 | 4/1977 | Harris | 152/381.4 X |
| 4,076,067 | 2/1978 | Gill | 152/381.4 |
| 4,150,854 | 4/1979 | Lohmeter | 152/366 X |

*Primary Examiner*—Charles A. Marmor
*Attorney, Agent, or Firm*—Stevens, Davis, Miller & Mosher

[57] ABSTRACT

A wire wheel is provided in which some of the array of spokes extending between the hub and the rim penetrate the latter in the outboard bead seat. This bead seat is of smaller diameter than the inboard bead seat but is covered by a ribbon of a plastics material the outer diameter of which corresponds to the bead seat. The plastics ribbon is trapped in the channel of the outboard bead seat and seals the spoke holes penetrating the outboard bead seat. Nevertheless a metal step is exposed above the plastics ribbon for abutment by the toe of the outboard tire bead (not shown).

6 Claims, 1 Drawing Figure

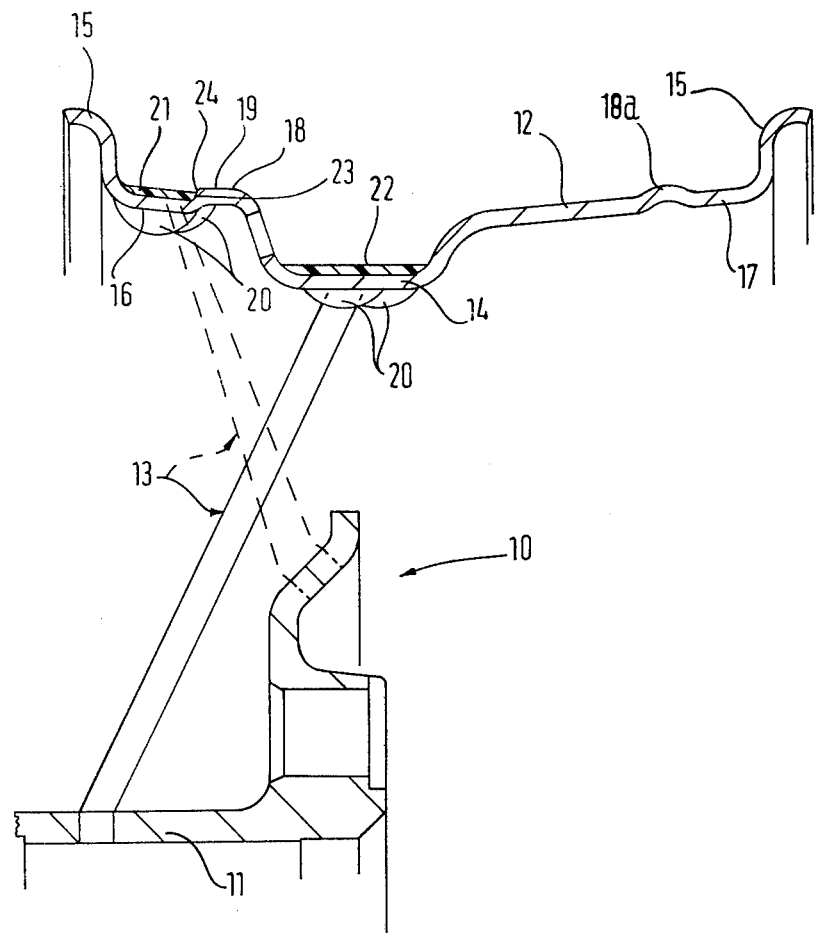

WIRE WHEELS SEALING STRUCTURE

This invention relates to improvements in wire wheels, by which is meant wheels of the type in which the metal rim on which a pneumatic tire is mounted is connected to a hub of the wheel by an array of spokes. The spokes penetrate the rim at their radially outer ends, the rim usually being formed with radially inwardly domed dimples or depressions in which nipple heads for the spokes are located.

One of the problems associated with wheels of this type is that the penetration of the rim by the spokes jeopardizes the air seal which is necessary if a tubeless pneumatic tire (i.e. one not provided with a separate innertube) is to be mounted on the wheel rim.

A variety of ways, more or less satisfactory, have been proposed for sealing those spoke holes of a rim which are located in its tire mounting well. However, in preferred forms of wire wheels at least some of the spokes penetrate the rim in one of the bead seat regions and no satisfactory prior art proposal solves the problem of sealing spoke holes in a bead seat region of a rim.

In the assignee's published British Pat. No. 2,009,662A the proposal is made to cover the whole of the air chamber portion of a wire wheel rim with a plastics material by injection moulding, thereby sealing spoke holes wherever they may be provided in the rim. However, the injection moulding technique requires a complex and expensive mould which must be centered with respect to the rim with great accuracy, as well as the use of a considerable volume of plastics material. There is the further problem that if the metal rim is provided with the conventional "flat hump" between the outboard bead seat and the well, to prevent unintentional dismounting of the outboard tire bead, e.g. in accordance with Standard No. 9, page 6-06 of The Tire and Rim Association Inc. Handbook, the outboard tire bead will tend to scrape or drag the plastics material off the "hump" in the course of mounting the wheel. Whether the "hump" is formed in the metal or, in accordance with the proposals of Specification No. 2009662A, is formed in the plastics layer, in the final assembly the toe of the outboard tire bead will abut a plastics material "hump", which provides a less satisfactory arrangement than the rubber-to-metal abutment of prior art metal rims having no plastics covering.

A principal object of the present invention is to improve upon the proposals of Specification No. 2009662A.

In accordance with one aspect of the present invention there is provided a wheel of the spoked type comprising a metal rim having radially outwardly extending tire bead retention flanges at opposite axial ends of a base of the rim and tire bead seat regions of the base adjacent the flanges, at least that bead seat region which will be on the outboard side in use of the wheel lying between the associated flange and a radially outwardly protruding hump in the base so that said one bead seat is of a shallow channel configuration and at least some of the spokes of the wheel extending to and penetrating the rim in said one bead seat region with respective nipple heads on the radially outer side of the rim in said channel, wherein said one bead seat is of smaller diameter than the other bead seat at corresponding positions along the axial lengths of the bead seats and said nipple heads are embedded in a plastics material strip on the rim confined within said channel, the radially outer surface of the strip exposed from said channel being of substantially equal diameter to the other bead seat at corresponding positions along the axial lengths of the bead seats.

Preferably the difference in diameter of the two metal bead seats is in the region of 3 mm, i.e. the radial thickness of said plastics strip is in the region of 1.5 mm.

In accordance with another aspect of the present invention there is provided a method for the production of a spoked wheel which has a metal rim comprising radially outwardly extending bead retention flanges at opposite axial ends of a base having tire bead seat regions adjacent said flanges, at least that one of the bead seats which will be on the outboard side of the rim in use of the wheel being of channel configuration and lying between the associated flange and a radially outwardly protruding hump in the rim. The method comprises locating spoke nipple heads in said channel to hold spokes which penetrate the rim in the region of said one bead seat and applying a ribbon of a plastics material to the radially outer side of the rim to be confined within said channel with said nipple heads embedded in said plastics material, the radial thickness of said ribbon being such that its radially outer surface is of equal diameter to the other bead seat at corresponding positions along the axial lengths of said bead seats.

The application of the method of the invention to a conventional wire wheel rim in which the bead seat regions are initially of uniform diameter comprises the preliminary step of removing metal from said one bead seat region to create an inequality in the bead seat diameters which is subsequently corrected by the application of said ribbon of plastics material.

This inequality, preferably in the region of 3 mm in a metal rim having an outboard bead seat in the region of 377.24 mm in diameter and an inboard bead seat in the region of 380.24 mm in diameter with tolerances of ±0.38 mm, is preferably produced by removing metal in such a way that the side of the "flat hump" on the outboard side of the rim presented to the bead seat which is being deepened is as nearly as possible perpendicular to the rim axis. When a ribbon 1.5 mm thick of plastics material is located in the deepened bead seat (and locked therein against axial displacement) the said side of the "flat hump" exposed above the plastics material ribbon will abut the toe of a tire bead seated on the plastics material ribbon and its perpendicularity to the rim axis will provide an effective "step" to prevent unintentional dismounting of the bead, this "step" being of equivalent height to that of a conventional rim having no plastics ribbon. If the deepened bead seat is formed by a rolling operation, rather than by removing metal from a pre-formed rim, nevertheless the side of the "flat hump" presented to the deeper bead seat is made as nearly as possible perpendicular to the rim axis, with an outer periphery forming with the outer circumference of the "flat hump" a corner of minimum radius. This can be achieved by crushing this corner in the rolling operation.

In a preferred embodiment of the invention the wheel rim is of the one-piece, well-base type provided with a tire mounting well between the bead seats and some of the spokes of the wheel extend to and penetrate the rim in the region of the well. In this case a second ribbon of plastics material is applied to the radially outer side of the rim to be confined within the well and seal the spoke holes therein.

Preferably the or both of the ribbons of plastics material are applied to the rim by spraying or dripping onto the rotating rim successive layers of a molten thermoplastic material until a ribbon of the required thickness has been built up.

A preferred embodiment of the invention will now be described with reference to the accompanying drawing which illustrates a wire wheel in radial section.

The wheel 10 illustrated comprises a hub 11 and a rim 12 which are joined by an array of wire spokes 13 extending therebetween. As is conventional, the one-piece rim 12 is of the drop-centre or well-base type having a well 14 to enable a tubeless pneumatic tire to be mounted on the rim so that the two beads (not shown) of the tire locate against respective tire bead retention flanges 15 of the rim on bead seat regions 16 and 17. As is also conventional, the well 14 is not symmetrically disposed between the bead seats 16 and 17, so that in use of the wheel its left hand side as viewed in the drawing will be outboard of the vehicle and its right hand side inboard, greater space existing on the inboard side of the wheel to accommodate a brake assembly (not shown).

As is also conventional, and in accordance with Standard No. 9 of The Tire and Rim Association Inc., the axially inner extremities of the bead seats 16 and 17 are defined by radially outward protrusions or humps 18 and 18A of the wheel rim which give the bead seats a channel configuration and by abutting the toes of the beads tend to prevent their unintentional displacement into the well 14. The hump 18 is a flat hump, which is to say that its radially outer surface 19 is flattened to form a cylindrical ledge between the bead seat 16 and the well 14.

The wheel illustrated is of the type in which the nipple heads at the radially outer ends of the spokes are located in respective dimples or radially inward, domed protrusions 20 of the rim in the well 14 and the bead seat 16 to which spokes extend. The purpose of the dimples 20 is to enable spokes to penetrate the rim in a variety of angular relationships thereto without any of the nipple heads projecting above the radially outer periphery of the rim.

As described in Specification No. 2,009,662A the holes in the rim 12 through which the spoke nipples pass are sealed by a plastics material applied to the radially outer surface of the rim 12.

However, in accordance with the present invention, the plastics material is confined to the two channel-shaped portions of the rim 12 in which the spoke holes are formed, namely the well 14 and the bead seat 16. In accordance with the present invention a circumferentially extending ribbon of plastics material 21 applied to and confined within the bead seat 16 is of such depth, or radial thickness, that the radially outer, exposed surface of the ribbon 21 is of the same diameter as the bead seat 17 at corresponding positions along the axial lengths of the bead seats 16 and 17. For this to be possible, it will be apparent that the bead seat 16 is initially of smaller diameter than the bead seat 17. Either the rim 12 is initially made with bead seats 16 and 17 of non- uniform diameter or a conventional rim 12 with bead seats 16 and 17 initially of uniform diameter is modified by deepening the channel of the bead seat 16, e.g. by removing metal from the radially outer surface of the rim 12 in the bead seat 16. In practice it is found that a difference in diameter between the bead seats 16 and 17 of only 3 mm is sufficient to enable a subsequently applied ribbon 21 of plastics material fully to embed, i.e. surround and cover, the nipple heads recessed into the dimples 20 in the bead seat 16 so that the ribbon 21 of plastics material seals the spoke holes in the bead seat 16 and presents an uninterrupted surface within the bead seat 16 on which a bead of a tire can be seated.

If the ribbon 21 of plastics material is 1.5 mm thick the radial extension of the side 23 of the "flat hump" 18 beyond the ribbon 21 of plastics material will be equivalent to the total height of this side in a conventional metal rim.

The side 23 of the "flat hump" 18 is as nearly as possible perpendicular to the rim axis and the corner 24 which it forms with the "ledge" 19 of the "flat hump" 18 is as sharp as is consistent with not damaging a tire bead passing over it. If the deepening of the bead seat 16 is achieved by removing metal this is easily accomplished. However, if the metal rim is originally made with non-uniform bead seats as shown, e.g. in a rolling operation, the corner 24 is preferably crushed in the rolls.

The above-described embodiment has a number of advantages over a rim in which the "flat hump" 18 is either formed in or covered by a plastics material. The ribbon 21 is firmly locked in the bead seat 16 against axial displacement. There is no tendency for a tire bead, passing over the hump 18 as the tire is mounted, to scrape or drag a plastics layer off the hump 18. In use of the wheel the outboard tire bead toe abuts a metal side 23 of the hump 18 as in a conventional rim, and not a yieldable plastics hump or hump covering.

The preferred method of forming the ribbon 21 is by rotating the wheel about its axis while spraying or dripping a molten thermoplastic material onto the bead seat 16 until the required thickness (e.g. 1.5 mm) has been built up.

In the embodiment illustrated the spoke holes in the well 14 of the rim are similarly sealed by a second ribbon 22 of plastics material confined within the well 14. It will be appreciated that in a modified wire wheel in which all of the spokes 13 extend to the bead seat 16 the second ribbon of plastics material 22 would be unnecessary.

I claim:

1. A wheel of the spoked type comprising a metal rim having radially outwardly extending tire bead retention flanges at opposite axial ends of a base of the rim and tire bead seat regions of the base adjacent the flanges, at least theat bead seat region which will be on the outboard side in use of the wheel lying between the associated flange and a radially outwardly protruding hump in the base so that said one bead seat is of a shallow channel configuration and at least some of the spokes of the wheel extending to and penetrating the rim in said one bead seat region with respective nipple heads on the radially outer side of the rim in said channel, wherein said one bead seat is of smaller diameter than the other bead seat at corresponding positions along the axial lengths of the bead seats and said nipple heads are embedded in a plastics material strip on the rim confined within said channel, the radially outer surface of the strip exposed from said channel being of substantially equal diameter to the other bead seat at corresponding positions along the axial lengths of the bead seats.

2. A wheel as claimed in claim 1, wherein the difference in diameter of the two metal bead seats is in the region of 3 mm, i.e. the radial thickness of said plastics strip is in the region of 1.5 mm.

3. A method for the production of a spoked wheel which has a metal rim comprising radially outwardly extending bead retention flanges at opposite axial ends of a base having tire bead seat regions adjacent said flanges, at least that one of the bead seats which will be on the outboard side of the rim in use of the wheel being of channel configuration and lying between the associated flange and a radially outwardly protruding hump in the rim, the method comprising locating spoke nipple heads in said channel to hold spokes which penetrate the rim in the region of said one bead seat and applying a ribbon of a plastics material to the radially outer side of the rim to be confined within said channel with said nipple heads embedded in said plastics material, the radial thickness of said ribbon being such that its radially outer surface is of equal diameter to the other bead seat at corresponding positions along the axial lengths of said bead seats.

4. A method as claimed in claim 3, wherein the bead seat regions are initially of uniform diameter and wherein the method comprises the preliminary step of removing metal from said one bead seat region to create an inequality in the beat seat diameters which is subsequently corrected by the application of said ribbon of plastics material.

5. A method as claimed in claim 4 wherein the said inequality is produced by removing metal in such a way that the side of the hump on the outboard side of the rim presented to said one bead seat which is being deepened is as nearly as possible perpendicular to the rim axis.

6. A method as claimed in claim 4 wherein the said inequality is produced in a rolling operation and wherein the side of the hump presented to the deeper bead seat is made as nearly as possible perpendicular to the rim axis, with an outer periphery forming with the outer circumference of the hump a corner of minimum radius by crushing this corner in the rolling operation.

* * * * *